United States Patent [19]

Kvalheim

[11] 4,405,278

[45] Sep. 20, 1983

[54] SELF-EMPTYING DUMP BOX

[76] Inventor: A. M. Kvalheim, 825 Petaluma Blvd. South, P.O. Drawer A, Petaluma, Calif. 94953

[21] Appl. No.: 306,293

[22] Filed: Sep. 28, 1981

[51] Int. Cl.[3] .......... B66F 9/06; B60P 1/04; B60P 1/64

[52] U.S. Cl. .......... 414/411; 414/404; 414/403; 414/414; 414/608; 414/424

[58] Field of Search .......... 414/403, 404, 411, 420, 414/414, 639-642, 644-647, 422-425, 303, 329, 743, 672, 662, 663, 664-666, 608

[56] References Cited

U.S. PATENT DOCUMENTS

| | | | |
|---|---|---|---|
| 2,289,024 | 7/1942 | Lambert | 414/424 |
| 2,482,692 | 9/1949 | Quales | 214/121 |
| 2,555,406 | 6/1951 | Golay | 298/22 |
| 2,582,759 | 1/1952 | Sass | 414/422 |
| 2,730,253 | 1/1956 | Oswalt | 414/411 |
| 2,764,307 | 9/1956 | Kughler | 414/639 |
| 3,360,143 | 12/1967 | Allen | 214/317 |
| 3,720,900 | 9/1966 | Sherman | 214/302 |

*Primary Examiner*—Robert B. Reeves
*Assistant Examiner*—James Barlow
*Attorney, Agent, or Firm*—Alfons Puishes

[57] ABSTRACT

A box or container for transporting and disposing of trash is constructed to be operated by the action of a forklift truck alone without the addition of special accessories and so constructed as to have a low overall height making it suitable for placement under machines, benches and other devices, because of the absence of operating mechanisms under the container. The box is constructed so that the discharge cover or lid, as well as a specially constructed dumping leg are automatically released by the action of the forklift. The dumping leg then drops into a pivot bracket customarily located on the edge of the receptacle which receives the trash and further action of the forklift causes the box to tilt or pivot around the leg and discharge the contents of the box. Further action of the forklift returns the leg to its position under the box and closes the cover or lid making the box ready for further receipt of trash.

5 Claims, 9 Drawing Figures

SELF-EMPTYING DUMP BOX

BACKGROUND OF THE INVENTION

Dump boxes or receptacles for removal of trash, some of which are operated by forklift trucks, are old in the art.

Thus U.S. Pat. No. 2,482,692 to Quales utilizes a scoop bucket which is pivotally mounted upon the end of a forklift at a point removed from its center of gravity so that the gravity alone would dump the contents of the scoop bucket when it is raised and return it to a horizontal position where it is held by suitable catch or latching mechanisms in said horizontal position, both when empty and when loaded.

U.S. Pat. No. 3,270,900 to Sherman utilizes a double lever combination assembly supported on rollers mounted on a carriage under the dump box and is equipped with suitable latch and chain operating mechanism. The carriage in turn is mounted on rollers and the entire assembly requires considerable elevation above the ground for its operation.

U.S. Pat. No. 3,360,143 to Allen likewise utilizes a forklift but relies on special lever arms, linkage, and pivot pins to effect the dumping operation including operating handles and spring mechanisms, necessitating a rather complicated construction.

U.S. Pat. No. 2,555,406 to Golay teaches a construction of a wagon for transporting bulk farm materials which is equipped with a tiltable body and mechanism providing a dumping feature for the wagon.

None of the prior art bears a similarity to applicant's which is particularly superior in simplicity and of construction and operation and requires a minimum of height for its use.

SUMMARY OF THE INVENTION

I have invented a dump box for use with a forklift which relies on the action of the forklift alone and comprises the following novel features. My box utilizes a pivoting cover or lid and a dumping leg pivoted near one end of the bottom and normally nested in a recess in the bottom. The box is pivotally mounted on a support or pallet which receives the prongs of the forklift. The box is raised and located over the bin or other receptacle which is to receive the trash and then by tapping it against the box, the linerlocking mechanism which holds the dumping leg and lid in position is released. This permits the cover or lid to start opening and drops the dumping leg in a vertical position as the box is rasied further. A suitable pivot bracket is fixed on the edge of the receiving receptacle and the box is lowered so that the leg is positioned within this pivot bracket. The box is then lowered further by means of the forklift which causes it to pivot about the dumping leg to assume an an angle of approximately 60°, thus permitting the door to open wide and the trash to empty into the bin or receptacle. The box is then raised, releasing the dumping leg from the pivot bracket and the box then moved forward over the edge of the bin or receptacle maintaining contact with the specially constructed pivot bracket. Dragging the dumping leg over this bracket starts the closing operation which is completed when the box is lowered sufficiently so that the dumping leg returns to its position in recess under the box and engages the cover or lid. The operation is completed by pushing the door against the bin or receptacle causing it to complete its engagement with the dumping leg.

DESCRIPTION OF A PREFERRED EMBODIMENT

Figure 1:
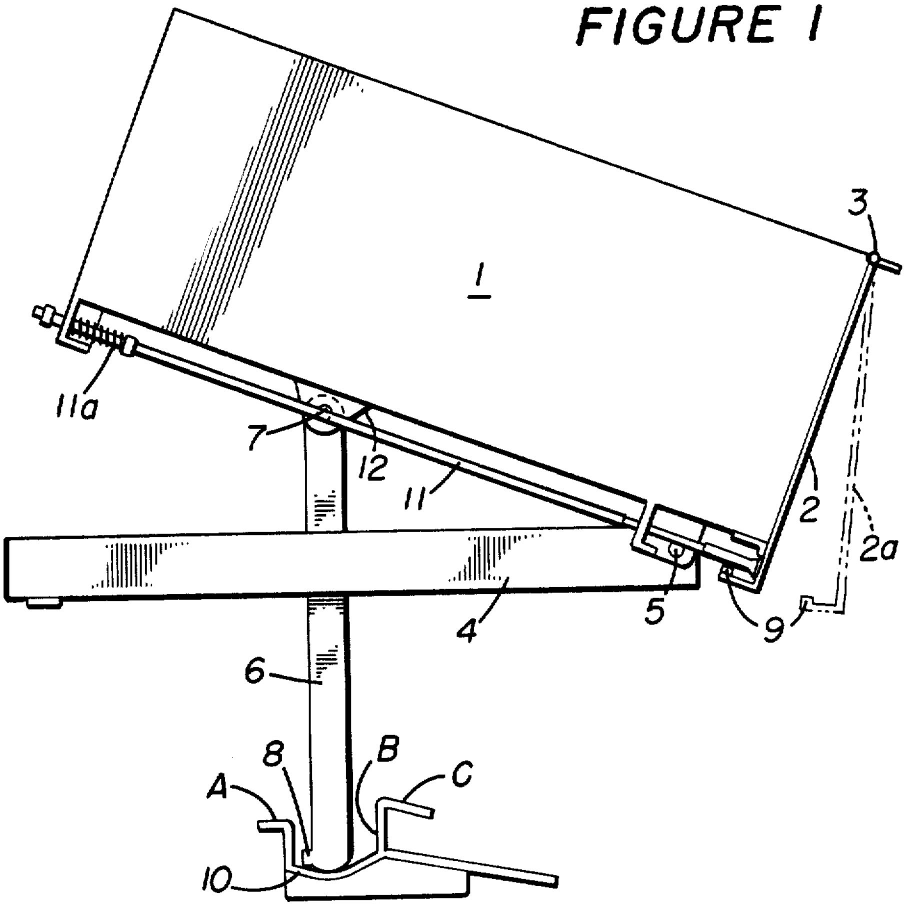
FIG. 1 is a side elevation of the entire assembly of the box at the mid point of the emptying step of the cycle.

Referring now to the figures and particularly first to FIG. 1, there is seen the body or container of the box 1 with its cover or lid 2 shown in a partially opened position at 2*a* which is hinged at the top of the body by hinge 3 and is welded to the body and to the cover 2. Body support or pallet 4 which is adapted to receive internally the prongs from a forklift at one end and has pivotally mounted on its other end the body or container 1 through pin 5.

Figure 8:
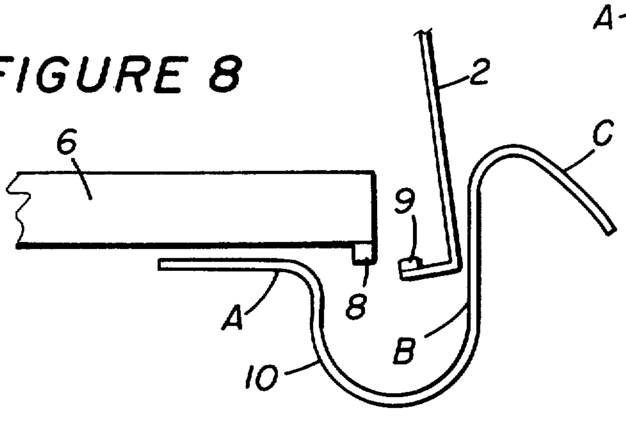
FIG. 8 is a partial side view showing the relationship of the dumping leg, lid and support bracket near the end of the final or closing step.

The dumping leg 6 which plays an important part in the operation of my device, is pivotally connected to the bottom of the container through pin 7 at a point about one-third the length of the container from the end opposite the door or lid. A catch member in the form of a bar having a rectangular cross-section 8 is welded to the bottom of the dumping leg 6 and a similar bar is welded to the bottom of the cover or lid 2 which has an angle shaped bottom and is seen at 9 and in more detail in FIG. 8. When in a closed position bars 8 and 9 engage one another thus holding the dumping leg in its horizontal position and the cover or lid in closed position.

Figure 9:
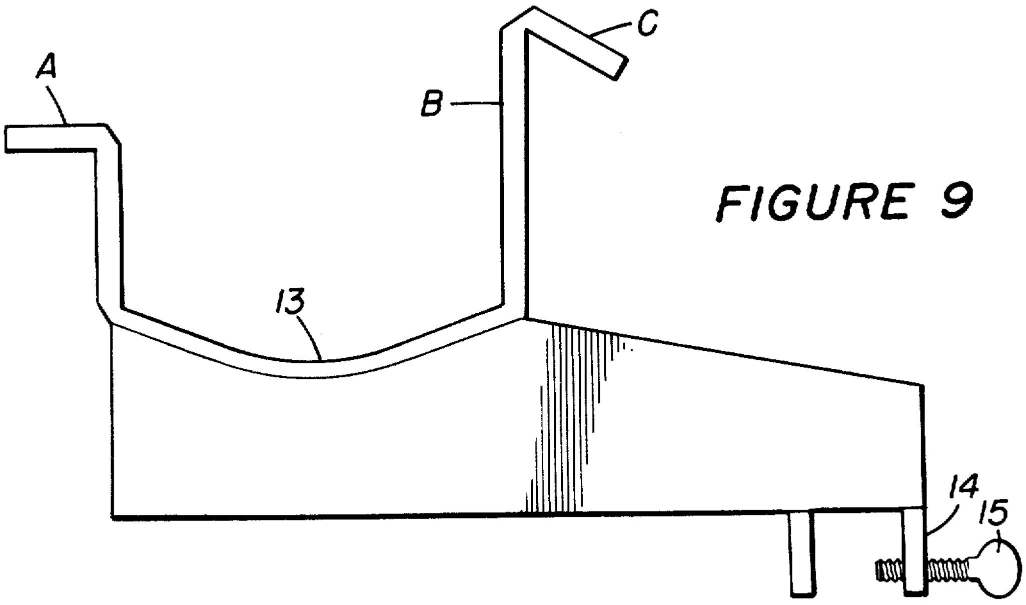
FIG. 9 is a side elevation of the pivot bracket for supporting of the dumping leg on the bin or receptacle.

A pivot bracket 10 which is disposed to receive the lower end of dumping leg 6 and adapted to fasten to the side of receptacle or bin 16 and is shown in more detail on FIG. 9 comprises a curved support surface 13, a lower horizontal member comprising operating surface A and upper horizontal member comprising operating surface C and one of the vertical members designated as operating surface B, whose function will be described below. The support bracket is constructed to fasten over the edge of the bin 16 by means of vertical members 14 and set screw 15.

Mounted horizontally along the bottom of the container is spring rod 11 and springs 11*a* which serve to assist in opening and closing door 2, as seen best in FIG. 1.

Figure 2:
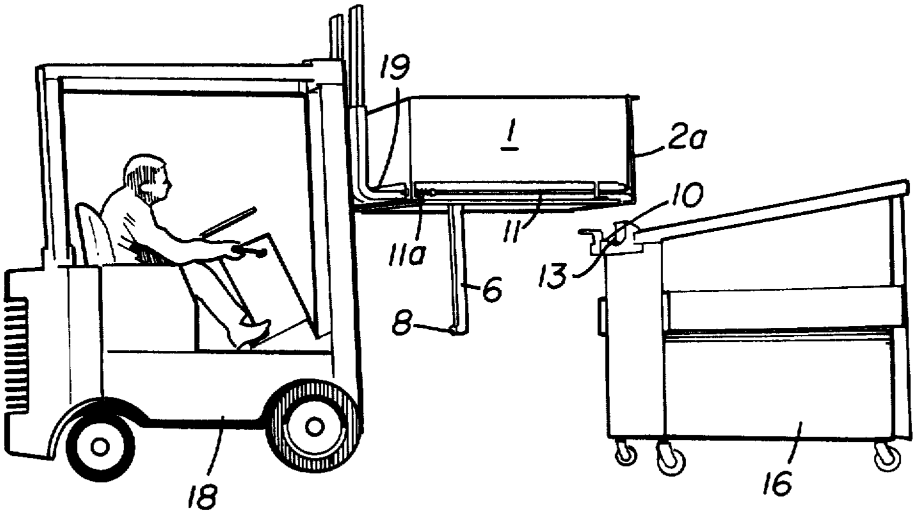
FIG. 2 shows the box and forklift after the box has been raised to start the dumping step.
Figure 3:
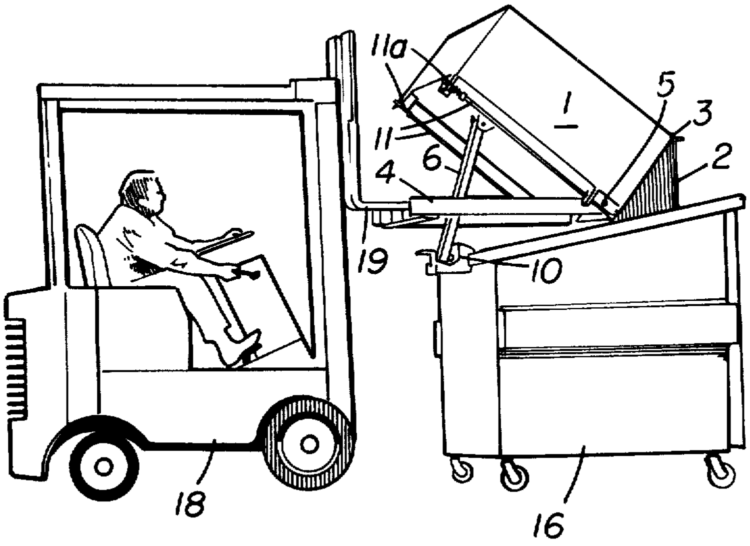
FIG. 3 shows the box and forklift during the actual dumping step of the operation schematically.
Figure 4:
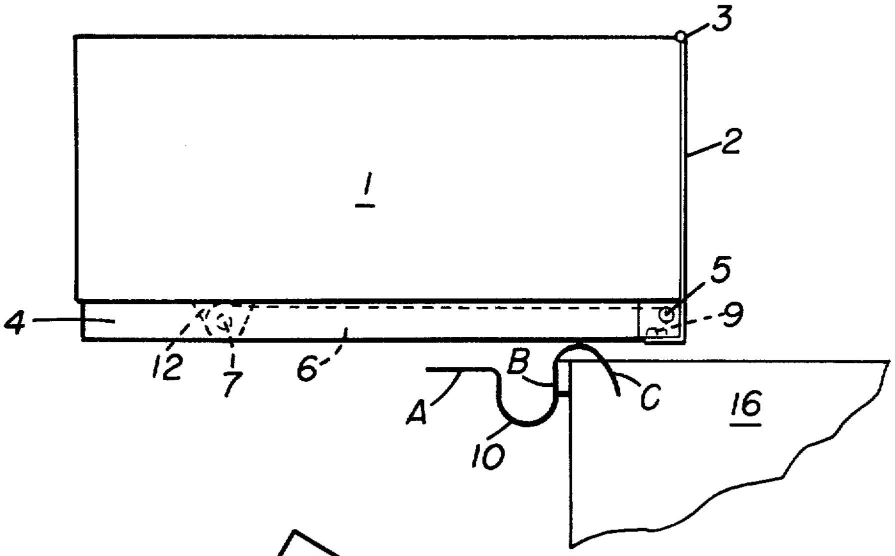
FIG. 4 is a side elevation showing the arrangement schematically of the principal parts just before start of the actual dumping step of FIG. 2.

Referring now to FIGS. 2 and 3 there will be seen the relation between the forklift and the box as well as the function of the dumping leg 6 and of pivot bracket 10.

Dumping leg 6 normally is positioned in a recess 12 in the bottom of container 1.

OPERATION

Figure 5:
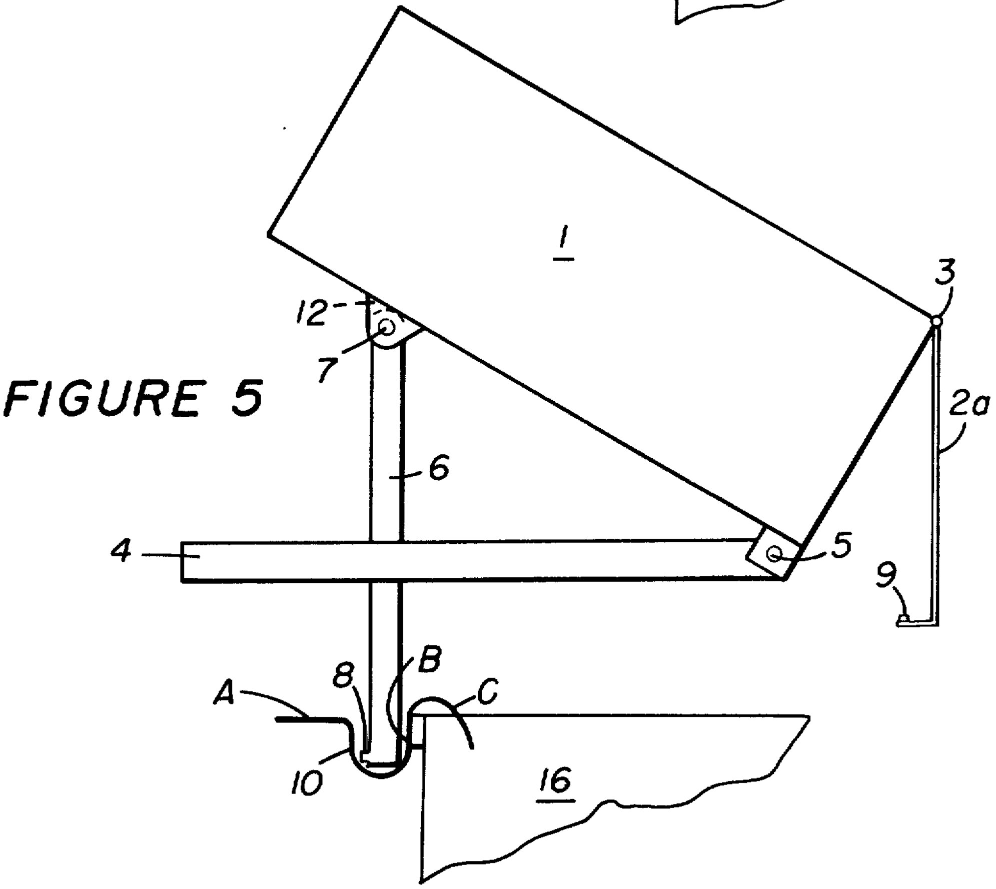
FIG. 5 is a side elevation showing the arrangement schematically of the principal parts during the actual dumping step of FIG. 3.
Figure 6:
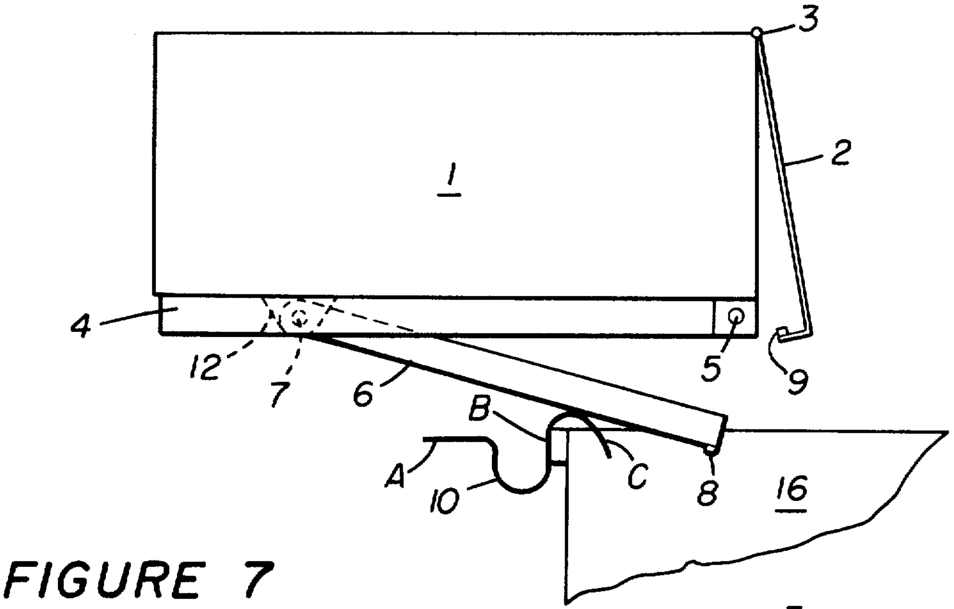
FIG. 6 is a schematic showing the arrangement of the principal parts at the start of the closing step.
Figure 7:
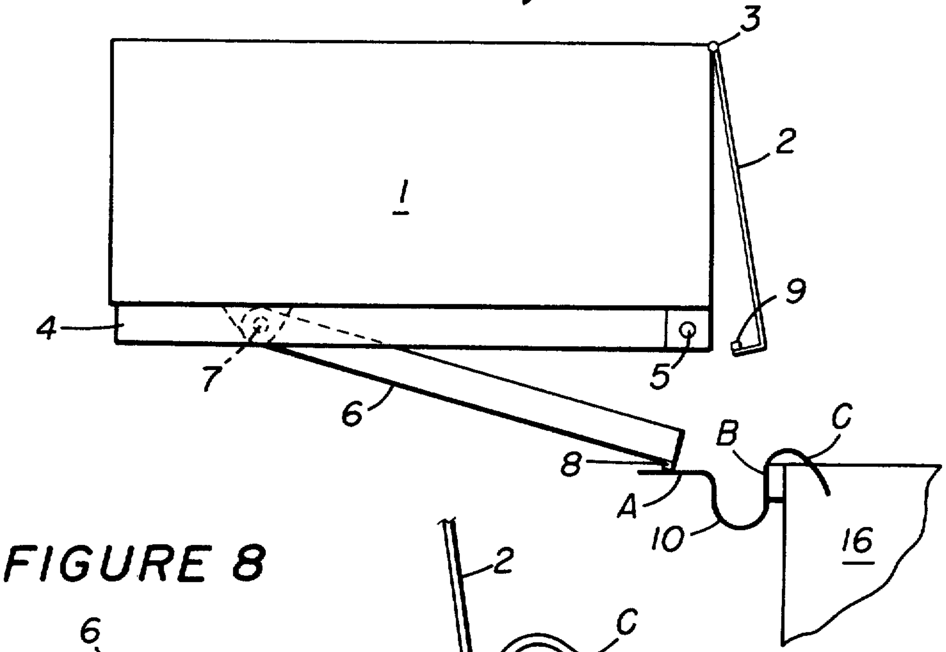
FIG. 7 is a side elevation showing the principal parts during the later stage of the closing operation and just before the completion of the closing.

The operation of my device is best understood by reference to FIGS. 4, 5, 6, and 7. Thus, in FIG. 4 there is shown schematically the dump box which has been elevated by means of the forklift to a position so that the door or lid 2 projects over the edge of bin 16. The leg 6 and door 2 are still interlocked by means of members 8 and 9. By quickly lowering the dump box and tapping the leg 6 on the top of surface C of pivot bracket 10, the members 8 and 9 are disengaged and leg 6 is free to drop while door 2 is free to swing open as the box is raised. The forks are then raised further and the box elevated sufficiently to drop leg 6 to a vertical position as seen on FIG. 2. Forklift truck 18 is then operated to advance box 1 over bin 16 and the box is further elevated and then lowered so that dumping leg 6 is inserted into pivot bracket 10 as shown in FIG. 5. The prongs of the forklift may now be lowered further which causes box 1 to tilt around pin 7 on leg 6 and gradually assume an angle as high as 60° to the horizontal. Cover 2 then swings to an open position as seen at 2*a*, permitting the trash to fly out of the container into the bin.

To close the container, the forklift again raises the entire box so that leg 6 is disengaged from support bracket 10. The box is then moved forward and lowered so that leg 6 rides on surface C of support bracket 10. Further movement of the box by means of the forklift away from bin 16 continues the closing of leg 6 until it drops onto surface A. Further lowering of box 1 continues to force leg 6 back up into its recess 12. At this point door 2 is at the same elevation as the side of bin 16. Further motion of the box toward the bin forces cover 2 against surface B towards a closed position and engages member 8 and 9 thus completing the closure of the container and making the box ready for movement for another load. Spring rod 11 and 11*a* assist in the opening and closing of cover 2 as mentioned above.

It is thus seen how the operation of my box is dependent almost entirely on the operation of the forklift and is independent of any elaborate mechanisms or other devices except the few shown. It is also seen how my box can be made of lowered dimensions for the same capacity because of the absence of any mechanisms underneath it thus making it adaptable for many purposes for which other boxes may not be adaptable such as under trash producing machinery, benches, etc.

I claim:

1. A self-emptying dump box for trash and the like adapted for operation by a forklift truck comprising:

a container of generally rectangular configuration;

said container having a first pivot on one of its bottom ends mounted on a pallet;

said pallet being adapted to receive fork members of a forklift truck;

a hinged cover positioned over the end of said container adjacent to said first pivot;

a swinging leg member having its first end mounted on a second pivot on the bottom of said container at a point opposite said first pivot;

said leg member being disposed to rotate about said second pivot from a horizontal position parallel to the bottom of said container to a vertical position at right angles to said bottom;

support means of generally U-shaped configuration disposed to support the second end of said leg member at a predetermined location under said container when said member is in a substantially vertical position;

whereby said container may be made to rotate about said pivots when the elevation of said pallet is altered by the action of said forklift;

a first engageable catch means positioned on the second end of said leg member opposite said second pivot;

a second catch means positioned on the bottom end of said hinged cover opposite the bottom of said container;

each of said catch means being disposed to engage one another and hold said cover in a closed position and to disengage said cover and said leg means to an open position by the action of said forklift truck on said pallet;

thereby causing the contents of said container to empty through said cover.

2. The device of claim 1 in which said catch means comprises a first member of rectangular cross-section positioned on said second end of said leg member; a projecting member positioned at right angles to said cover; a second member of rectangular cross-section positioned on said projecting member; said second member being disposed to engage said first member.

3. The device of claim 1 in which said U-shaped means for supporting said second end of said leg member comprises:

a bottom section of arcuate configuration disposed to receive said second end of said leg member;

a first horizontal section joined to a first vertical section of said U-shaped support;

a second horizontal section joined to an opposite second vertical section of said U-shaped support;

whereby the combined action of the raising and lowering of the forklift truck upon said leg and said U-shaped means effects the closing of said leg and said cover.

4. The device of claim 1 including a longitudinal recess in the bottom of said container, said recess being disposed to house said leg when said leg is in a horizontal position.

5. The device of claim 3 including means for fixedly positioning said U-shaped support means upon the edge of a trash receptacle.

* * * * *